E. PERRIN.
PROPELLING OR BEARING SCREW OF VARIABLE PITCH.
APPLICATION FILED MAR. 15, 1921.

1,402,646.

Patented Jan. 3, 1922.
2 SHEETS—SHEET 1.

INVENTOR
Edouard Perrin
BY
Emil Bonnelycke
ATTORNEY

UNITED STATES PATENT OFFICE.

EDOUARD PERRIN, OF PARIS, FRANCE.

PROPELLING OR BEARING SCREW OF VARIABLE PITCH.

1,402,646.

Specification of Letters Patent.

Patented Jan. 3, 1922.

Application filed March 15, 1921. Serial No. 452,599.

*To all whom it may concern:*

Be it known that I, EDOUARD PERRIN, a citizen of the Republic of France, and resident of Paris, France, (post-office address 61 Avenue Victor-Emmanuel,) have invented a new and useful Propelling or Bearing Screw of Variable Pitch, which apparatus is fully set forth in the following specification.

The present invention relates to screw propellers; and its object, briefly stated, is the provision of an improved propeller, the pitch of whose blades may be varied to meet different or special conditions, and which may be utilized for various purposes and for action in conjunction with fluids or liquids of different kinds.

According to the invention, the propeller is constructed to comprise a set of main resistance elements which are set along the blades and each of which may be uninterrupted, said elements being given an elastic torsion capable of being regulated within certain limits and being built to withstand the strains set up by the action of centrifugal force when the propeller is in motion or by the reactions exerted on the blades by the fluid in which the propeller is moving. The propeller may be employed to develop, under the action of the torque and owing to the reaction of the air on the blades, a horizontal traction or thrust effort, a vertical lifting action, or an effort acting at any desired inclination; it may be utilized in a manner similar to that of an ordinary water propeller, or a propeller designed to work in a fluid other than water; and it may also be employed either to effect displacement of the fluid in which it works, or to utilize the absolute or relative movement of the current of fluid in which it is submerged.

The accompanying drawing shows various forms which the invention may take in practice, in which drawing.

Figure 4:
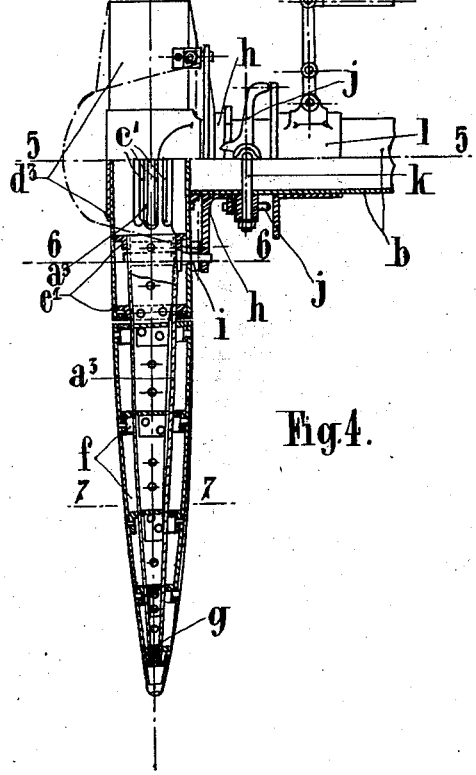
Fig. 4 is a view, half in side elevation and half in section, of a light, two-bladed all-metal propeller.
Figure 5:
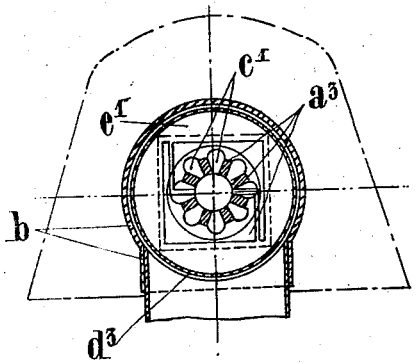
Figure 6:
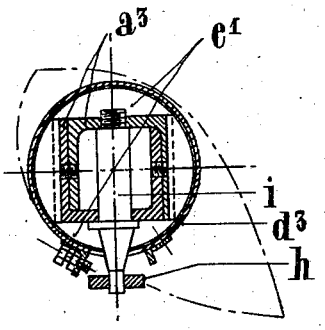
Figure 7:
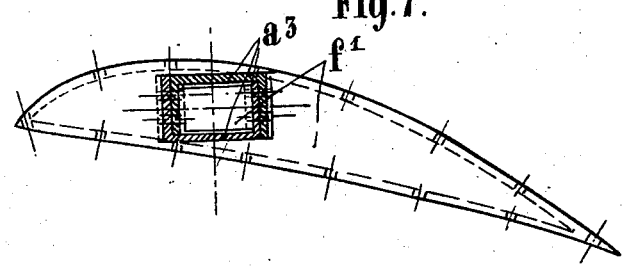

Figs. 5, 6 and 7 are transverse sections taken, respectively, on lines 5—5, 6—6 and 7—7, Fig. 4.

Figure 1:
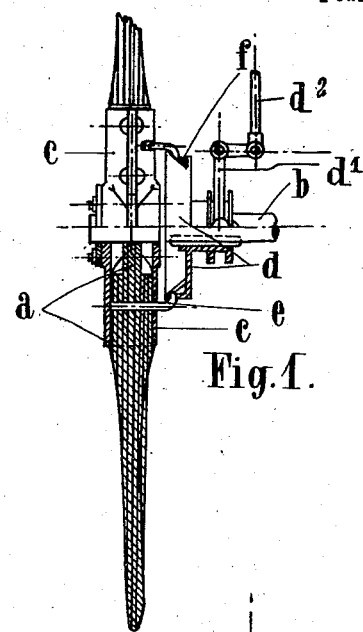
Figure 1 is a view of a propeller with two wooden blades, the upper half of the figure being in elevation and the lower half in section.

In the form shown in Fig. 1, the principal resistance element $a$ is constructed of layers or laminæ of wood glued together, and is integral with the blades of the propeller. A certain number of the layers or laminæ of the element $a$, which in this instance constitutes the hub of the propeller, are cut away adjacent the propeller shaft $b$ to facilitate the torsion, while on the other hand a sheath $c$ is fitted over the said element to absorb any bending strains in this zone.

To regulate the torsion of the said resistance element or hub, a sliding disk-like sleeve $d$ is preferably employed, which is provided on its peripheral edge with oppositely-located inclined or cam-like notches $f$ to engage the free ends of a set of angular fingers or pins $e$ secured to the branches of the hub and extending through slots in the arms or branches of sheath $c$. This sleeve or disk $d$ is additionally provided with a hub portion which is keyed to said shaft to enable it to rotate therewith and, at the same time, to permit the required sliding movement and which is itself formed with a circumferentially flanged or grooved free end for engagement by a suitable shifting fork $d'$ operatively connected to a lever system $d^2$ or other actuating means. The arrangement is such, therefore, that when the disk is moved along the propeller shaft, the inclined or cam edges of its notches $f$ will act on the pins or fingers $e$ in a manner to push them sidewise, thereby twisting the propeller blades.

Figure 3:
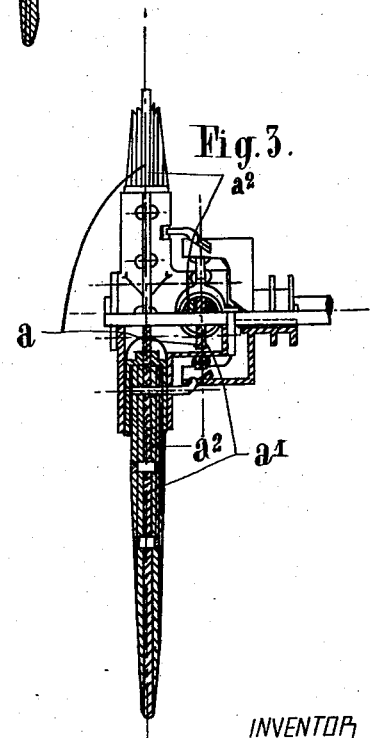
Fig. 3 is a view generally similar to Fig. 1, but representing a four-bladed propeller.
Figure 2:
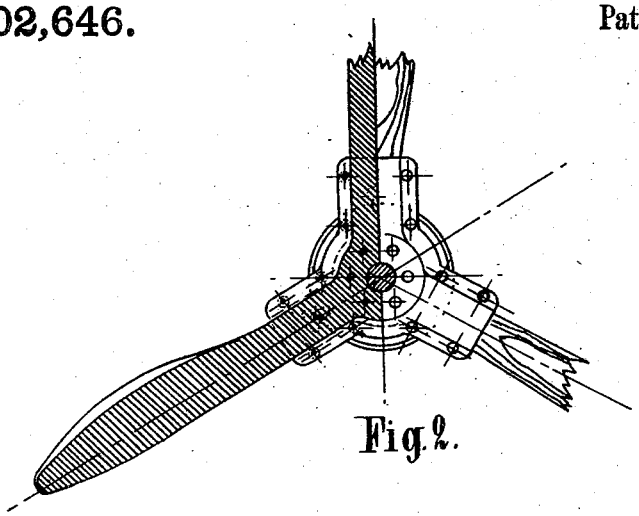
Fig. 2 shows the main features of Fig. 1 applied to a three-bladed propeller, the right-hand half appearing in elevation and the left-hand half in section.

The same structural features are embodied in the three-bladed propeller represented in Fig. 2 and, also, in the four-bladed construction represented in Fig. 3; but in the latter construction two resistance elements $a'$ are employed, which are disposed in different planes and each of which consists of a metal plate or layer, the wooden layers $a^2$ being fastened by pins to the opposite faces of the metal plates.

In the construction illustrated in Figs. 4 to 7, the resistance element $a^3$ consists of two interfitted, substantially U-shaped metal parts or members fastened together by rivets or threaded pins, as best shown in Fig. 6.

Immediately adjacent the shaft $b$, however, the cross-sectional shape of the two parts or members is changed to that of a hollow half-circle in which longitudinal grooves $c'$ are formed for the purpose of increasing the flexibility of the element; (see Fig. 5). In this zone, the bending strains are absorbed by a tube $d^3$ which is fitted over the resistance element and rigidly related to the same by means of four transversely-arranged, circular ribs $e'$ adapted to turn in said tube.

In order to reduce the weight, specially-formed ribs $f'$ are fastened to the element $a^3$ by rivets or screws, and on these ribs are positioned two stamped-metal plates serving as the back and the front of the blade. Weights $g$ are used, however, for balancing purposes.

To increase the efficiency, a metal covering plate—indicated in dotted lines in Fig. 4—constructed and fastened in the same way as the blades, could be placed in the extensions of the latter, over the hub of the propeller. The propeller shaft $b$ terminates in a sleeve which fits over tube $d^3$.

The pitch variation is effected by the rotation of a sleeve $h$ (Fig. 4), disposed coaxially with the propeller shaft and terminating in two diametrically-opposite slotted branches or forks which are engaged with cross-pins $i$ carried by the element $a^3$, so that when said sleeve $h$ is turned, its forks will tend to carry the cross-pins with them and the torsion to which said pins are thus subjected will be transmitted to the resistance element. This rotation of sleeve $h$ may be produced by the action of two symmetrical bell-crank levers $j$ supported on a spindle or pin $k$ secured to shaft $b$. One arm of each bell-crank is disposed parallel to said shaft and is engaged with a projection on sleeve $h$, while the other arm is disposed perpendicular to the shaft and has a laterally-bent terminal which extends into position for engagement by the adjacent disk-like end of a controller sleeve $l$ which is mounted to slide on the shaft. Hence, when said sleeve $l$ is moved toward the propeller (toward the left in Fig. 4), its disk portion will press against the bent terminals of the last-named bell-crank arms and, in consequence, will rock both bell-cranks counter-clockwise, whereby their first-named arms will press against the projections on sleeve $h$ and turn the same, thus twisting the blades, as above explained.

I claim as my invention:

1. A propeller, embodying one or more yielding resistance elements along which the blades are connected; and means for exerting a variable torsional pressure upon said element so as to vary the pitch of the blades.

2. A propeller, embodying a yielding resistance element along which the propeller blades extend longitudinally and to which they are secured, said element extending uninterruptedly the entire length of the blades; and means for exerting a variable torsional pressure upon said element so as to vary the pitch of the blades.

3. A propeller, embodying a yielding resistance element with which the blades are connected; and means, including a sleeve movably related to said element and an operating device therefor, for exerting a variable torsional pressure upon said element so as to vary the pitch of the blades.

4. A propeller, embodying a yielding resistance element with which the blades are connected; and means, including a sleeve slidably mounted on the propeller shaft, a device for shifting said sleeve along said shaft, and a movable device interposed between said sleeve and said yielding element and engaged with the latter, for exerting a variable torsional pressure thereupon during the shifting movement of said sleeve so as to vary the pitch of the blades.

5. A propeller, embodying a yielding resistance element with which the blades are connected; pins secured to said element at opposite sides of the propeller shaft; and means movably related to said shaft and engaged with said pins for exerting a variable torsional pressure upon said element so as to vary the pitch of the blades.

6. A propeller, embodying a yielding resistance element with which the blades are connected; pins secured to said element at opposite sides of the propeller shaft; a sleeve rotatably mounted on said shaft and having diametrically-opposite pin-receiving portions; and means for turning said sleeve so as to exert a variable torsional pressure upon said yielding element and thereby vary the pitch of the blades.

7. A propeller, embodying a yielding resistance element with which the blades are connected; pins secured to said element at opposite sides of the propeller shaft; a sleeve rotatably mounted on said shaft and having diametrically-opposite pin-receiving portions and projections; levers mounted on said shaft and engageable with said projections to turn said sleeve and thereby exert a variable torsional pressure upon said yielding element so as to vary the pitch of the blades; and a controller sleeve slidably mounted upon said shaft to operate said levers.

8. A propeller, embodying a yielding resistance element comprising two interfitted U-shaped members fastened together and to which the blades are attached; and means for exerting a variable torsional pressure upon said element so as to vary the pitch of the blades.

9. A propeller, as claimed in claim 8, in which the central portions of the members of the resistance element are formed with longitudinal grooves to increase their flexibility.

10. A propeller, embodying a yielding resistance element comprising two interfitted U-shaped members fastened together and provided with ribs; and blades secured to said element and consisting of front and back plates attached to said ribs.

11. A propeller, embodying a yielding resistance element comprising two interfitted U-shaped members fastened together and provided with ribs; blades secured to said element and consisting of front and back plates attached to said ribs; a tube fitted over said element; transversely-arranged circular ribs encircling said element and turnable within said tube; and a sleeve on the propeller shaft fitting over said tube.

In testimony whereof I have signed this specification in the presence of two subscribing witnesses.

EDOUARD PERRIN.

Witnesses:
GEORGES PASCAL KARRIÉRE,
GERMAINE MICHIELS.